ered new and useful Improvements in Anthracene Coloring-Matters and Processes of Making Same, of which the following is a specification.
UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 909,800.  Specification of Letters Patent.  Patented Jan. 12, 1909.

Application filed August 14, 1908. Serial No. 448,607.

*To all whom it may concern:*

Be it known that I, MAX HENRY ISLER, chemist, a citizen of the Swiss Republic, residing at Mannheim, Germany, have invented new and useful Improvements in Anthracene Coloring-Matters and Processes of Making Same, of which the following is a specification.

In the specification of Patent No. 739,145 it is stated that 2-aminoanthraquinone upon being heated with anhydrous aluminum chlorid in the absence of a solvent at temperatures between 250° C. and 280° C. yields a yellow vat coloring matter.

I have discovered that by reacting on 2-aminoanthraquinone with aluminum chlorid in the presence of nitrobenzene a reaction takes place different from that which takes place in the aforesaid case, and new coloring matters are obtained which, from an alkaline hydrosulfite vat, dye unmordanted cotton reddish brown shades which are of great fastness. Instead of 2-aminoanthraquinone itself, other anthraquinone compounds containing an amino group in position 2, such for instance as 2.6-diaminoanthraquinone and 2.7-diaminoanthraquinone, can be employed and similar results be obtained.

The following example will serve to illustrate further the nature of this invention and how it can be carried into practical effect, but my invention is not confined to this example. The parts are by weight. Boil together ten (10) parts of 2-aminoanthraquinone, one hundred (100) parts of nitrobenzene and ten (10) parts of aluminum chlorid until the formation of coloring matter is complete. The excess of nitrobenzene can be removed by distillation with steam, or the coloring matter can be precipitated from the nitrobenzene melt by means of alcohol. It is insoluble in water, in caustic soda solution and in alcohol, and partly soluble in nitrobenzene yielding a reddish brown solution. It gives a bluish black solution in concentrated sulfuric acid and a reddish brown vat with hydrosufite and caustic soda solution. It dyes cotton from this vat red-brown.

The coloring matters obtainable from 2.6-diaminoanthraquinone and 2.7-diaminoanthraquinone differ from that produced from 2-aminoanthraquinone by yielding yellowish brown vats with hydrosulfite and caustic soda solution, and greenish black solutions in concentrated sulfuric acid, while their solutions in nitrobenzene are yellowish brown and greenish black respectively.

Now what I claim is:

1. The process of producing coloring matter of the anthracene series by heating a 2-aminoanthraquinone compound with aluminum chlorid in the presence of nitrobenzene.

2. The process of producing coloring matter of the anthracene series by heating 2-aminoanthraquinone with aluminum chlorid in the presence of nitrobenzene.

3. As new articles of manufacture the coloring matters which can be obtained by heating a 2-aminoanthraquinone compound with aluminum chlorid in the presence of nitrobenzene which coloring matters are insoluble in water, in caustic soda solution and in alcohol, soluble in sulfuric acid yielding from bluish black to green-black solutions, partly soluble in nitrobenzene yielding from yellowish brown to greenish black solutions, and which with hydrosulfite and caustic soda solution yield from reddish brown to yellowish brown vats which dye cotton reddish brown shades.

4. As a new article of manufacture the coloring matter which can be obtained by heating 2-aminoanthraquinone with aluminum chlorid in the presence of nitrobenzene which coloring matter is insoluble in water, in caustic soda solution and in alcohol, soluble in sulfuric acid yielding a bluish black solution, partly soluble in nitrobenzene yielding a reddish brown solution, and which with hydrosulfite and caustic soda solution yields a reddish brown vat which dyes cotton reddish brown shades.

In testimony whereof I have hereunto set my hand in the presence of two subscribing witnesses.

MAX HENRY ISLER.

Witnesses:
J. ALEC. LLOYD,
JOS. H. LEUTE.